(12) United States Patent
Hsieh

(10) Patent No.: US 10,248,603 B2
(45) Date of Patent: Apr. 2, 2019

(54) PCI EXPRESS NETWORK CARD

(71) Applicant: ACCTON TECHNOLOGY CORPORATION, Hsinchu (TW)

(72) Inventor: Cheng-Che Hsieh, Taipei (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 254 days.

(21) Appl. No.: 15/210,774

(22) Filed: Jul. 14, 2016

(65) Prior Publication Data

US 2017/0322901 A1    Nov. 9, 2017

(30) Foreign Application Priority Data

May 6, 2016  (TW) .............................. 105206488 U

(51) Int. Cl.
| | |
|---|---|
| *G06F 1/00* | (2006.01) |
| *G06F 13/40* | (2006.01) |
| *G06F 13/42* | (2006.01) |
| *G06F 1/20* | (2006.01) |
| *G06F 1/18* | (2006.01) |

(52) U.S. Cl.
CPC ...... *G06F 13/4068* (2013.01); *G06F 13/4282* (2013.01); *G06F 1/18* (2013.01); *G06F 1/20* (2013.01); *G06F 2213/3808* (2013.01); *Y02D 10/14* (2018.01); *Y02D 10/151* (2018.01)

(58) Field of Classification Search
CPC ....... G06F 1/18; G06F 1/20; G06F 2213/3808
See application file for complete search history.

(56) References Cited

U.S. PATENT DOCUMENTS

| | | | |
|---|---|---|---|
| 8,069,293 B1* | 11/2011 | Rogan .................... | G06F 13/385 370/248 |
| 9,405,336 B1* | 8/2016 | Li ........................... | H05K 7/20 |
| 2015/0254201 A1* | 9/2015 | Billi ....................... | G06F 13/4022 710/316 |

* cited by examiner

*Primary Examiner* — Zachary K Huson
(74) *Attorney, Agent, or Firm* — Lynette Wylie; Apex Juris, PLLC.

(57) ABSTRACT

A PCI Express network card is disclosed, including a circuit board, a plate, a plurality of integrated circuits, and two heat sinks. The circuit board has five ports. The plate is provided on the circuit board and near a front edge of the circuit board, wherein the plate has a plurality of openings. The integrated circuits are provided on the circuit board, including a first processor and a second processor, which consume the most power. The first processor and the second processor are arranged in a staggered way. Each of the heat sinks abuts against the first processor and the second processor, respectively. An area of each of the heat sinks is greater than an area of each one of the first processor and the second processor. Whereby, effective heat dissipation could be achieved.

13 Claims, 6 Drawing Sheets

PCI EXPRESS NETWORK CARD

BACKGROUND OF THE INVENTION

1. Technical Field

The present invention relates generally to a network card, and more particular to a PCI Express (Peripheral Component Interconnect Express) network card with five ports.

2. Description of Related Art

In response to the increasing demand of information, optical fibers have been gradually replacing wire cables as the medium for transmitting data in network, for optical fibers permit transmission over longer distances and at higher bandwidths in a safer way than wire cables.

The current mainstream of the optical fiber network cards used in personal computers, workstations, and servers is PCI Express network card. To meet different requirements, an optical fiber network card generally has one to four ports; wherein a port is adapted to be electrically connected to an adapter, which allows a small form-factor pluggable transceiver (SFP) to be inserted therein. An optical fiber can be used to transmit data after being connected to the SFP transceiver.

However, with broader bandwidth of data transmission, more integrated circuits (e.g., the processor or the memory) on an optical fiber network card would generate higher heat. Therefore, optical fiber network cards lacking good heat dissipation mechanism are prone to overheating, leading to malfunction. Due to this problem, an optical fiber network card would be only allowed to have a very limited number of ports, or the integrated circuits thereon would be even overheating and damaged easily.

BRIEF SUMMARY OF THE INVENTION

In view of the above, the primary objective of the present invention is to provide a PCI Express (Peripheral Component Interconnect Express) network card, which has a maximum number of ports within a certain size limitation, and is provided with more high-speed ports within a certain power supplying limitation. Furthermore, the PCI Express card disclosed in the present invention provides effective heat dissipation.

The present invention provides a PCI Express network card, which includes a circuit board, a plate, a plurality of integrated circuits, and two heat sinks. The circuit board has five ports, each of which is adapted to be electrically connected to a small form-factor pluggable transceiver. The plate is provided on the circuit board near a front edge of the circuit board, wherein the plate has a plurality of openings. The plurality of integrated circuits are provided on a surface of the circuit board, wherein the integrated circuits comprise a first processor and a second processor with most power consuption; the first processor is electrically connected to a part of the ports, while the second processor is electrically connected to another part of the ports; the first processor and the second processor are staggered on the surface. The heat sinks abut against the first processor and the second processor, respectively, wherein an area of each of the heat sinks is greater than an area of each one of the first processor and the second processor.

With the aforementioned design, by using the first processor and the second processor to take care of different tasks of data processing, the transmission efficiency could be increased, while the power consumption could be appropriately shared. Furthermore, since the first processor and the second processor are staggered and located at different locations on the circuit board, and there are heat sinks provided on the network card, effective heat dissipation could be achieved. Whereby, the heat generated by the first processor would not affect the performance of the second processor. In this way, a PCI Express network card with five ports would be able to operate normally even at a relatively high temperature.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
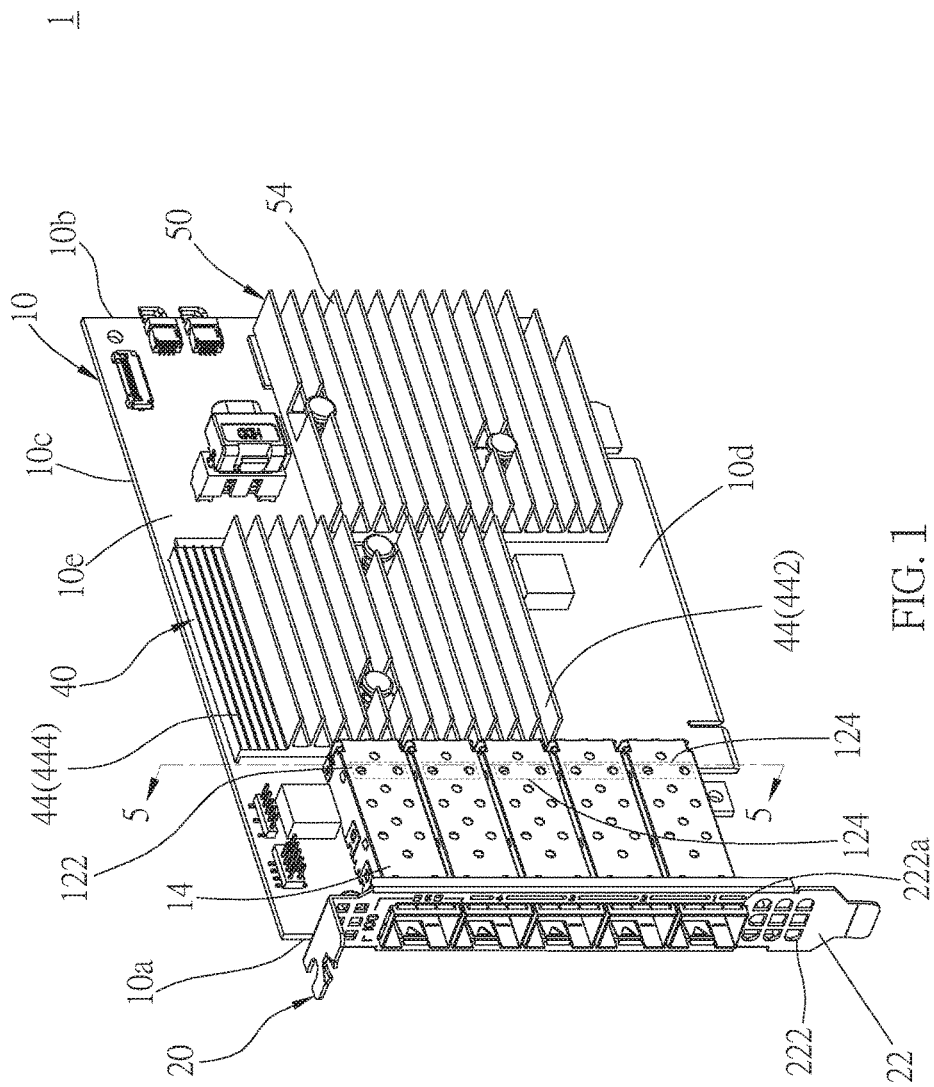
FIG. 1 is a perspective view of a first preferred embodiment of the present invention.
Figure 2:
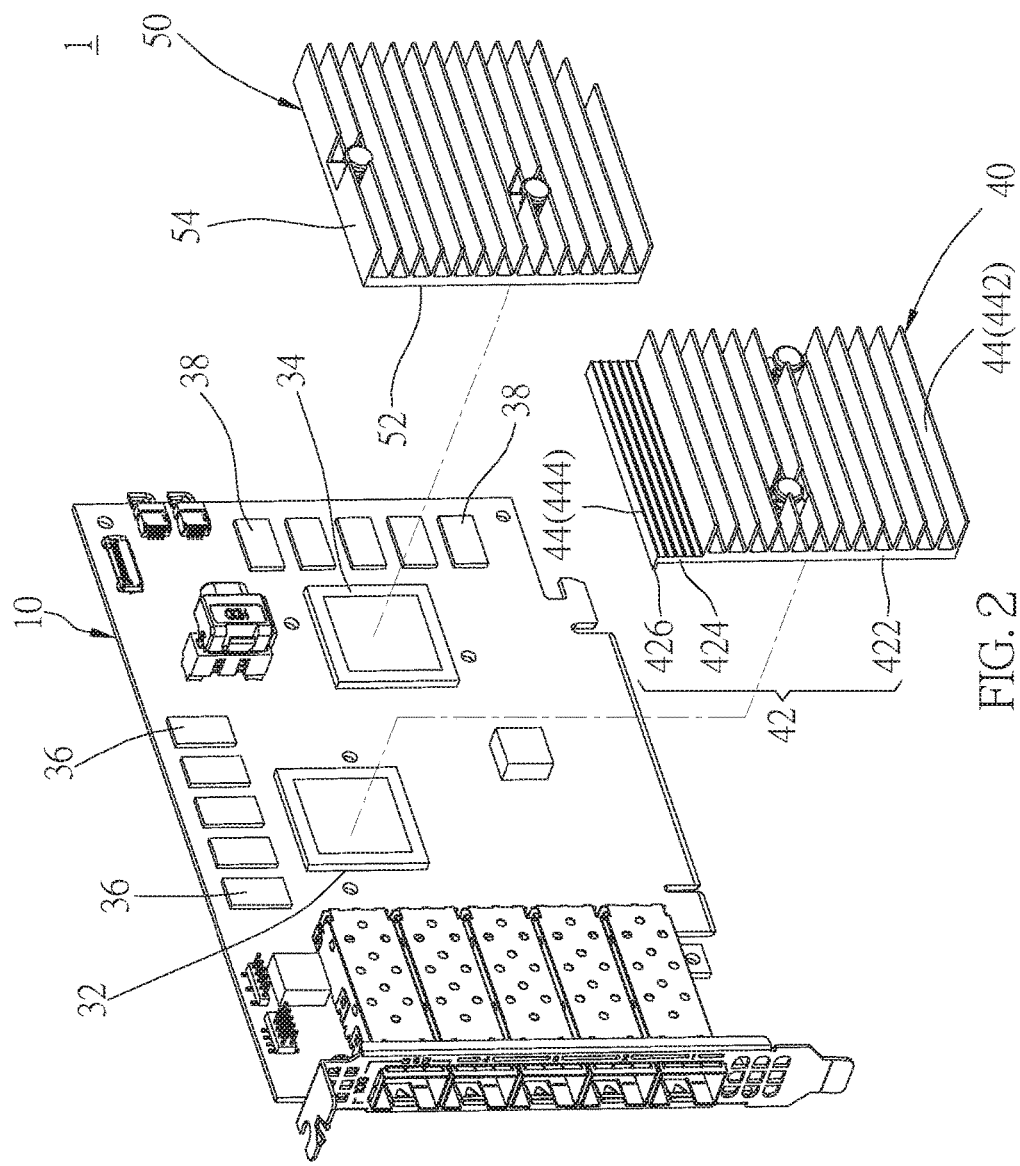
FIG. 2 is an exploded view of the first preferred embodiment of the present invention.

A PCI Express network card 1 of the first preferred embodiment of the present invention is illustrated in FIG. 1 to FIG. 5, including a circuit board 10, a plate 20, a plurality of integrated circuits, and two heat sinks 40, 50.

The circuit board 10 follows the specification of FHHL (full height, half length) for PCI Express standard, wherein the circuit board 10 has five ports 122, 124, each of the ports 122, 124 is electrically connected to an adapter 14, and each of the adapters 14 allows a small form-factor pluggable (SFP) transceiver (not shown) to be inserted therein, so that each of the ports 122, 124 is electrically connected to one of the SFP transceivers. The PCI Express network card 1 is different from a commonly-seen network card, which typically has 10 Gbps ports, in that, in the first preferred embodiment, the five ports 122, 124 include a 10 Gbps port 122 and four 25 Gbps ports 124. The circuit board 10 has a front edge 10a, a rear edge 10b, a top edge 10c, and a plugging portion 10d, wherein the plugging portion 10d is adapted to be plugged into a PCI Express slot (not shown) on a motherboard (not shown).

Figure 3:
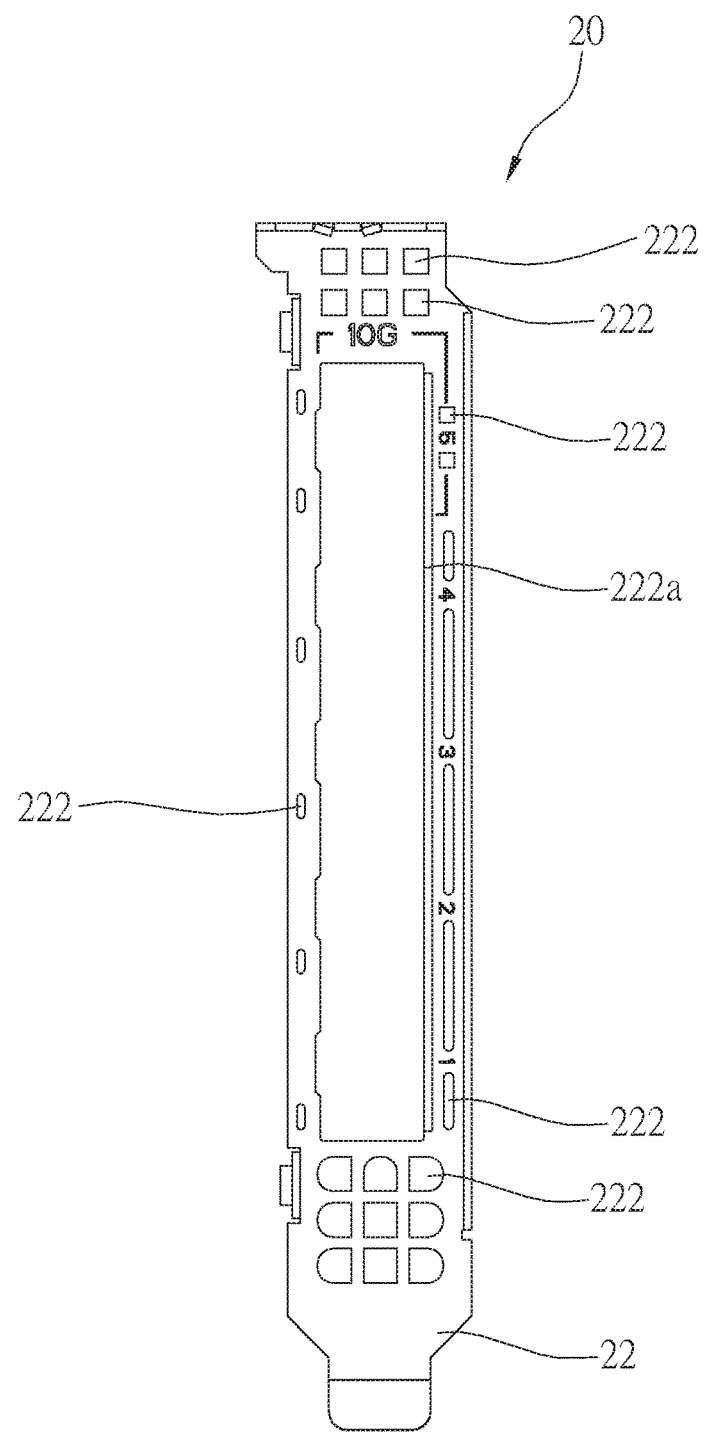
FIG. 3 is a front view of the first preferred embodiment of the present invention.

The plate 20 is provided on the circuit board 10, and is near the front edge 10a of the circuit board 10, wherein the plate 20 has an outer lateral surface 22, which has a plurality of openings 222 provided thereon, as shown in FIG. 3. The openings 222 include a long opening 222a, through which each of the adapters 14 passes. Preferably, a total area of these openings 222 is greater than an area of a rest part of the outer lateral surface 22. In other words, more than 50% of the plate 20 belongs to the openings 222, providing sufficient space for air to flow through.

Figure 4:
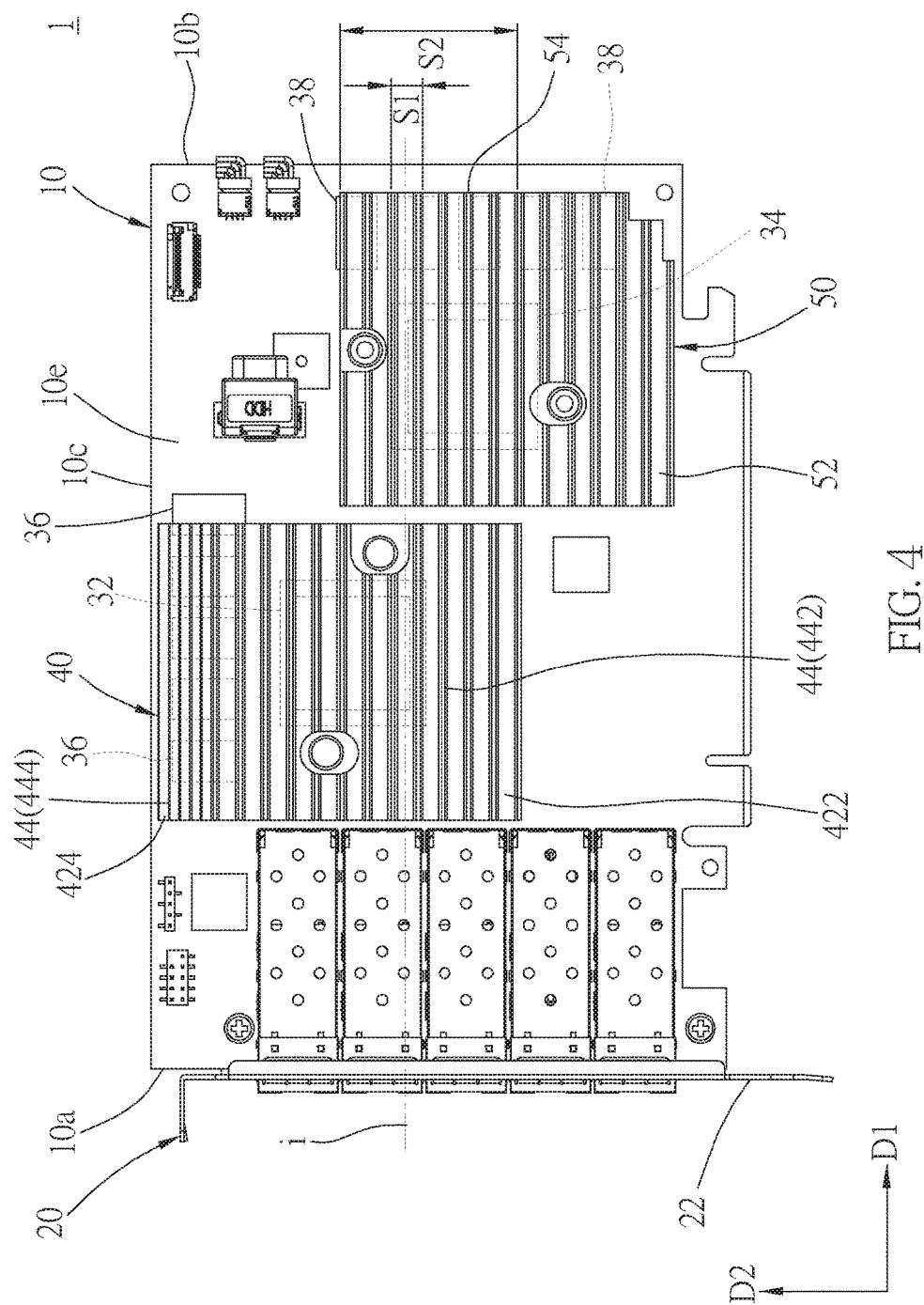
FIG. 4 is a lateral view the first preferred embodiment of the present invention.

Each of the integrated circuits is provided on a surface 10e of the circuit board 10. The integrated circuits include a first processor 32 and a second processor 34, which consume the most power, and a plurality of first memories 36 and a plurality of second memories 38, which consume less power than the first and the second processors 32, 34. As shown in FIG. 4, the first processor 32 and the second processor 34 are staggered and located at different locations on the circuit board 10, wherein a part of the first processor 32 and a part of the second processor 34 are located on different sides of a reference axis i, respectively. The reference axis i is parallel to the surface 10e of the circuit board 10, and is perpendicular to the outer lateral surface 22 of the plate 20. Herein, we define a direction parallel to the reference axis i as a reference direction D1, and a direction perpendicular to the reference direction D1 and parallel to the surface 10e of the circuit board 10 as another reference direction D2. In other words, the projections of the first processor 32 and the second processor 34 projected on the reference direction D2 according to the reference direction D1 are partially overlapped, wherein a length S1 of an overlapped area in the reference direction D2 is preferably no greater than a quarter of a total length of the first processor 32 or the second processor 34 in the reference direction D2. In practice, if the circuit board 10 provides simpler functions and, therefore, has fewer components, or the circuit board 10 is layered so that the windings are more flexible, leading to more abundant space on the circuit board 10, then the first processor 32 and the second processor 34 could also be located in a way that they don't overlap each other in the reference direction D1.

The first memories 36 are located beside the first processor 32, and are near the top edge 10c of the circuit board 10, while the second memories 38 are located beside the second processor 34, and are near the rear edge 10b of the circuit board 10. The first processor 32 is electrically connected to the 10 Gbps port 122, two of the 25 Gbps ports 124, and the first memories 36 to process data sent from the 10 Gbps port 122 and two of the 25 Gbps ports 124. The second processor 34 is electrically connected to the other two 25 Gbps ports 124, the second memories 38, and the PCI Express slot (through wirings on the plugging portion 10d) to process data sent from the other two 25 Gbps ports 124 and data communication to and from the motherboard. Owing to the first processor 32 and the second processor 34 are responsible for processing network data and the data communication to and from the motherboard, the first processor 32 and the second processor 34 consume the most power in comparison to other of the integrated circuits. Within a certain size limitation for a PCI Express interface card, by designating the first processor 32 and the second processor 34 to different memories and different ports, the requirements of data processing and power consumption could be both satisfied, which avoids the problem that one single processor could not be able to provide sufficient data processing ability, and could consume too much power.

The heat sinks 40, 50 include a first heat sink 40 and a second heat sink 50, wherein the first heat sink 40 and the second heat sink 50 are provided on the circuit board 10, and abut against the first processor 32 and the second processor 34, respectively. An area of each of the heat sinks 40, 50 is greater than three times of an area of each one of the first processor 32 and the second processor 34. In addition, the first heat sink 40 further extends to shade at least a part of the first memories 36 without physically contacting the first memories 36. Similarly, the second heat sink 50 further extends to shade at least a part of the second memories 38 without physically contacting the second memories 38. In the first preferred embodiment, a combined area of the heat sinks 40, 50 occupies 35-40% of the surface 10e of the circuit board 10. Each of the heat sinks 40, 50 includes a base 42, 52 and a plurality of fins 44, 54, respectively. The bases 42, 52 abut against the first processor 32 and the second processor 34, respectively. The fins 44, 54 extend in the reference direction i, whereby air could flow between the fins 44, 54 to enhance heat dissipation. The heat sinks 40, 50 are staggered, i.e., the projections of the heat sinks 40, 50 projected in the reference direction D1 on the plane of the reference direction D2 are partially overlapped. Furthermore, each of the fins 44, 54 in the overlapped area of the projections of the heat sinks 40, 50 aligns with each other on a same axis, so that the airflow would not be hindered. Preferably, a length S2 of the overlapped area of the heat sinks 40, 50 in the reference direction D2 is no greater than two third of a total length of the heat sinks 40, 50 in the reference direction D2. In other words, the overlapped area should not be too large to affect the heat dissipation on a rear side of the second heat sink 50.

Figure 5:
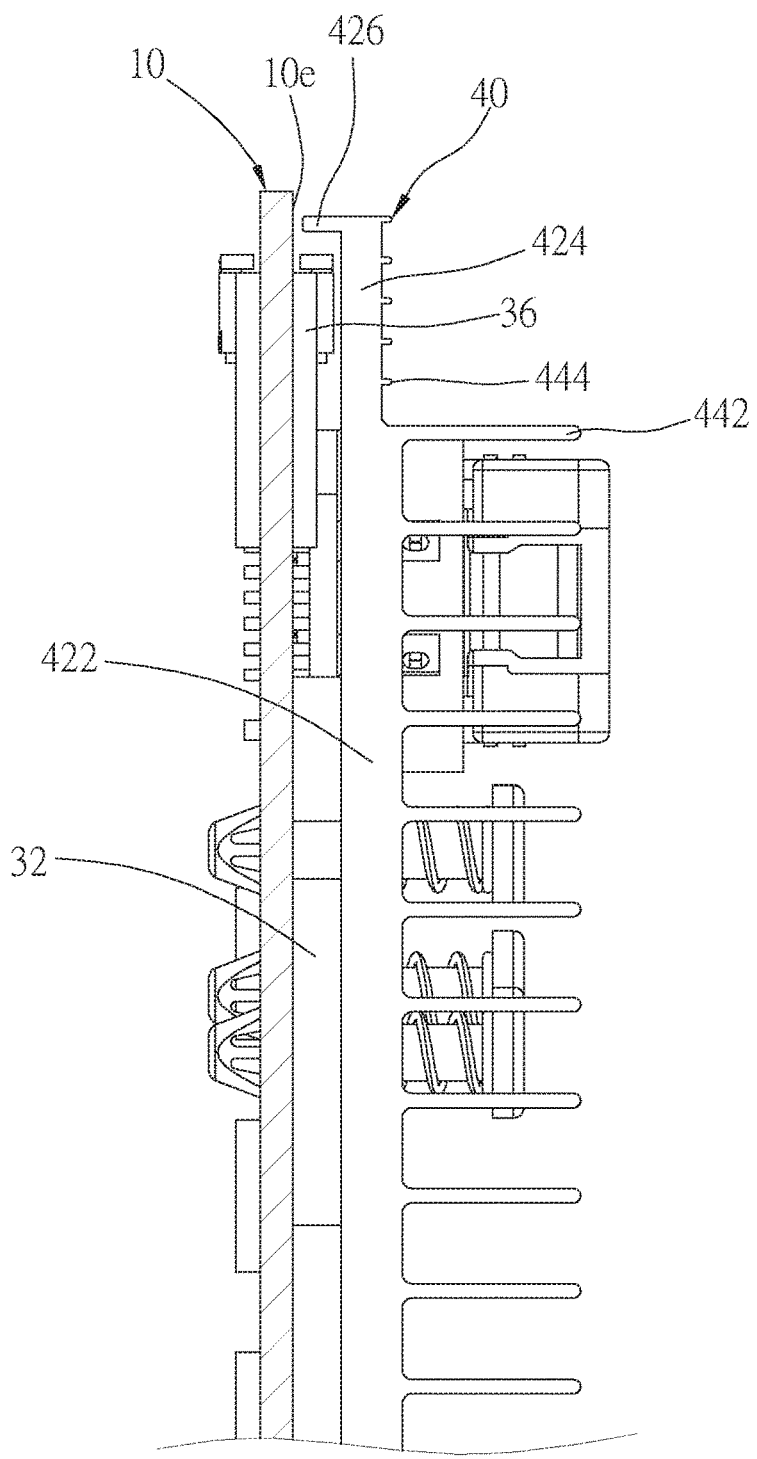
FIG. 5 is a sectional view along the 5-5 line in FIG. 1.

As shown in FIG. 4 and FIG. 5, in the first preferred embodiment, the base 42 of the first heat sink 40 includes a first base 422 and a second base 424, and the fins 44 of the first heat sink 40 include a plurality of first fins 442 and a plurality of second fins 444. The first base 422 abuts against first processor 32. A thickness of the second base 424 is less than a thickness of the first base 422, and at least a part of the second base 424 shades the first memories 36 without physically contacting the first memories 36. Also, an extending portion 426 is further projected from an edge of the second base 424 toward the surface 10e of the circuit board 10. The first fins 442 are connected to the first base 422, while the second fins 444 are connected to the second base 424. A height of the first fins 442 is greater than a height of the second fins 444.

With the aforementioned structure, when the PCI Express network card 1 is plugged into a PCI Express slot of a machine (e.g., a server) and while the machine is operating, a fan inside the machine would guide air into the machine from outside, wherein the air would flow toward the rear edge of the circuit board 10 through the openings 222 on the plate 20. Since the first processor 32 and the second processor 34 are staggered, when the heat generated by the first processor 32 is brought backward by the airflow, the hot airflow would not completely blow on the second processor 34, so that the heat generated by the second processor 34 could be still brought away be cooler airflow. Since more than 50% of the plate 20 belongs to the openings 222, sufficient amount of airflow would pass by the circuit board 10. Furthermore, since an extending direction of the fins 44, 54 of the heat sinks 40, 50 is the same with a direction of airflow, the heat generated by the first and the second processors 32, 34 could be effectively dissipated. Though the heat sinks 40, 50 shade at least a part of the first memories 36 and at least a part of the second memories 38 without physically contacting the heat sinks 40, 50, there would be still adequate space for heat dissipation, for the first and the second memories 36, 38 are arranged at locations near the edges (i.e., the top edge 10c and the rear edge 10b, respectively) of the circuit board 10. Furthermore, the airflow inside the machine would be sufficient to bring away the heat generated by the first and the second memories 36, 38.

Also, since the thickness of the second base 424 of the first heat sink 40 is thinner than that of the first base 422, and the height of the second fins 444 is less than that of the first fins 442, only few of the heat generated by the first processor 32 would be conducted toward the second base 424 and the second fins 444. As a result, the heat generated by the first processor 32 would not affect the heat dissipation of the first memories 36. At the same time, the area for heat dissipation required by the first processor 32 would be still left unoccupied.

Whereby, according to the results of experiments, the PCI Express network card 1 could be still able to operate normally under regular circumstances even if the temperature inside the machine reaches 50 degrees Celsius.

Figure 6:
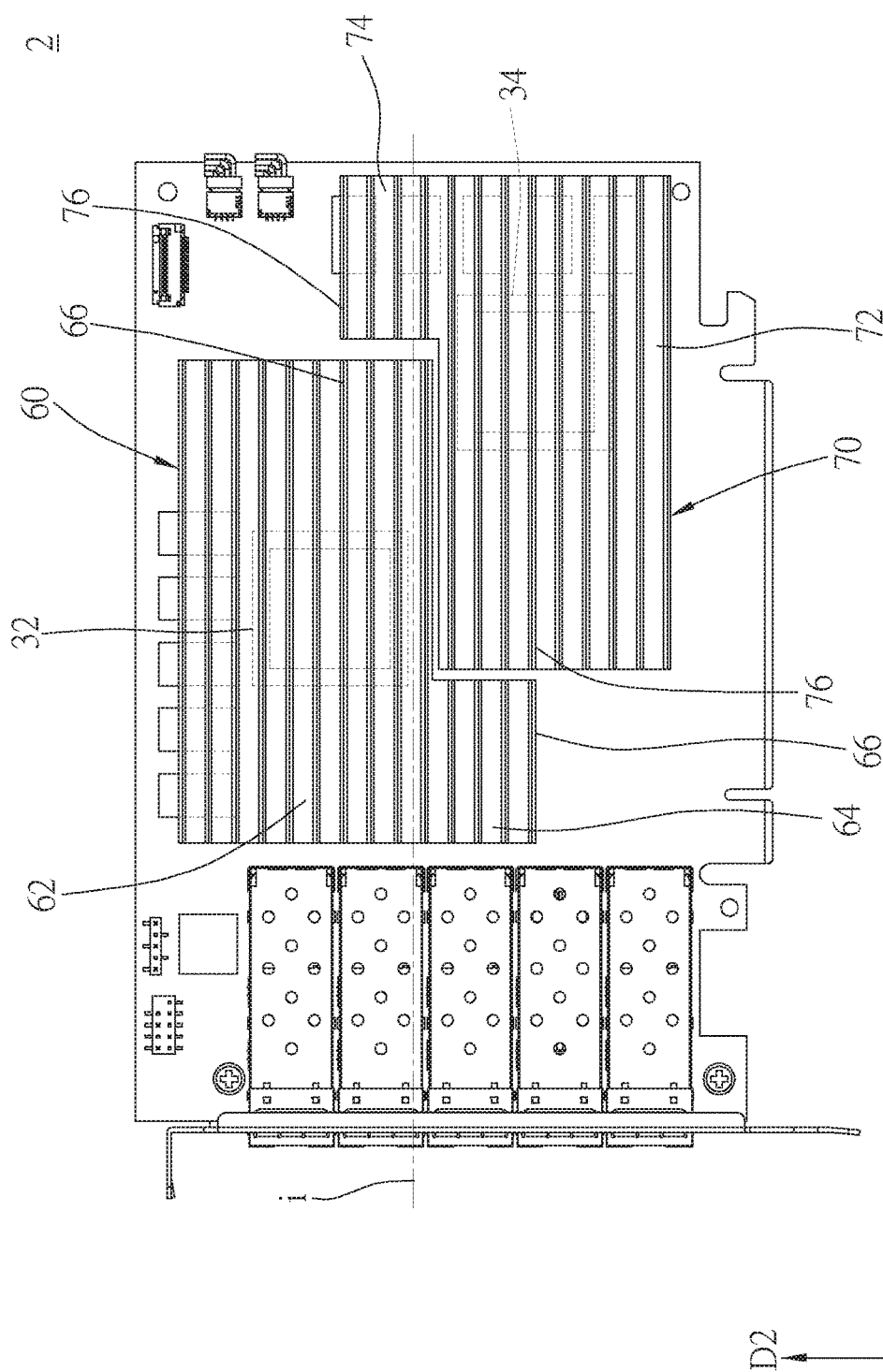
FIG. 6 is a lateral view of a second preferred embodiment of the present invention.

A PCI Express network card 2 of the second preferred embodiment of the present invention is illustrated in FIG. 6, which has basically the same structure with that of the first preferred embodiment, except that the first processor 32 and the second processor 34 are located on different sides of the reference axis i, respectively. In other words, the first and the second processors 32, 34 don't overlap each other in the reference direction D1. In addition, each one of a first heat sink 60 and a second heat sink 70 in the second preferred embodiment includes, respectively, a first portion 62, 72 and a second portion 64, 74, wherein the first portions 62, 72 are located on different sides of the reference axis i, respectively. The first portion 62 of the first heat sink 60 abuts against the first processor 32, while the first portion 72 of the second heat sink 70 abuts against the second processor 34. The second portion 64 of the first heat sink 60 is located on the same side of the reference axis i with the first portion 72 of the second heat sink 70, and the second portion 64 of the first heat sink 60 overlaps the first portion 72 of the second heat sink 70 in the reference direction D1. On the other hand, the second portion 74 of the second heat sink 70 is located on the same side of the reference axis i with the first portion 62 of the first heat sink 60, and the second portion 74 of the second heat sink 70 overlaps the first portion 62 of the first heat sink 60 in the reference direction D1. Each of fins 66, 76 in the overlapped area of the first heat sink 60 and the second heat sink 70 in the reference direction D1 is formed on the same axis with another one of the fins 66, 76.

The structure of the PCI Express network card 2 of the second preferred embodiment could also provide effective heat dissipation. According to the results of experiments, the PCI Express network card 2 could be still able to operate normally even if the temperature inside the machine reaches 50 degrees Celsius. In practice, if the environmental temperature is lower (e.g., 40 degrees Celsius), each of the heat sinks 60, 70 could be only provided with the first portions 62, 72, omitting the second portions 64, 74.

In summary, by staggering the first processor and the second processor, which consume the most power, on the circuit board, and by providing the heat sinks, effective heat dissipation could be achieved. In this way, the heat generated by the first processor would not affect the performance of the second processor, and a PCI Express network card with five ports could still operate normally even at a relatively high temperature.

It must be pointed out that the embodiments described above are only some preferred embodiments of the present invention. All equivalent structures which employ the concepts disclosed in this specification and the appended claims should fall within the scope of the present invention.

What is claimed is:

1. A PCI Express network card, comprising:
a circuit board having five ports, each of which is adapted to be electrically connected to a small form-factor pluggable transceiver;
a plate provided on the circuit board near a front edge of the circuit board, wherein the plate has a plurality of openings;
a plurality of integrated circuits provided on a surface of the circuit board, wherein the integrated circuits comprise a first processor and a second processor; the first processor and the second processor are respectively connected to different parts of the ports; the first processor is directly electrically connected to a part of the ports, while the second processor is directly electrically connected to another part of the ports; the first processor and the second processor are staggered on the surface; and
two heat sinks abutting against the first processor and the second processor, respectively, wherein an area of each of the heat sinks is greater than an area of each one of the first processor and the second processor.

2. The PCI Express network card of claim 1, wherein the heat sinks are arranged in a staggered way; each of the heat sinks has a plurality of fins, which extend in a reference direction; the reference direction is parallel to the surface of the circuit board, and is perpendicular to the plate.

3. The PCI Express network card of claim 1, wherein the ports comprises four 25 Gbps ports and a 10 Gbps port; the first processor is electrically connected to two of the 25 Gbps ports and the 10 Gbps port, while the second processor is electrically connected to the other two of the 25 Gbps ports.

4. The PCI Express network card of claim 3, wherein each of the heat sinks overlaps each other in the reference direction, and each of the fins in an overlapped area of the heat sinks in the reference direction is on a same axis with another one of the fins.

5. The PCI Express network card of claim 3, wherein at least a part of each of the heat sinks is located on different sides of a reference axis, respectively; the reference axis is parallel to the reference direction.

6. The PCI Express network card of claim 5, wherein each of the heat sinks comprises a first portion and a second portion; the first portion of each of the heat sinks is located on different sides of the reference axis, respectively, and abuts against the first processor and the second processor, respectively; the second portion of one of the heat sinks is located on the same side of the reference axis with the first portion of the other one of the heat sinks; each of the fins on the second portion of one of the heat sinks is on a same axis with one of the fins on the first portion of the other one of the heat sinks.

7. The PCI Express network card of claim 1, wherein the openings are provided on an outer lateral surface of the plate; a total area of the openings is greater than an area of a rest part of the outer lateral surface.

8. The PCI Express network card of claim 1, wherein an area of the heat sinks occupies 35-40% of an area of the surface of the circuit board.

9. The PCI Express network card of claim 1, wherein the integrated circuits further comprises a plurality of first memories and a plurality of second memories; the first memories are provided on the surface of the circuit board near the first processor, and are also near an edge of the circuit board; the second memories are provided on the surface of the circuit board near the second processor, and are also near another edge of the circuit board; one of the heat sinks shades at least a part of the first memories without physically contacting the first memories; the other one of the heat sinks shades at least a part of the second memories without physically contacting the second memories.

10. The PCI Express network card of claim 9, wherein one of the heat sinks comprises a first base, a second base, a plurality of first fins, and a plurality of second fins; the first base abuts against the first processor; the second base shades at least a part of the first memories without physically contacting the first memories; a thickness of the second base is less than a thickness of the first base; the first fins are connected to the first base, while the second fins are connected to the second base; a height of the first fins is greater than a height of the second fins.

11. The PCI Express network card of claim 10, wherein the other one of the heat sinks comprises a first base, a second base, a plurality of first fins, and a plurality of second fins; the first base abuts against the second processor; the second base shades at least a part of the second memories without physically contacting the second memories; a thickness of the second base is less than a thickness of the first base; the first fins are connected to the first base, while the second fins are connected to the second base; a height of the first fins is greater than a height of the second fins.

12. A PCI Express network card, comprising:
a circuit board having five ports, each of which is adapted to be electrically connected to a small form-factor pluggable transceiver;
a plate provided on the circuit board near a front edge of the circuit board, wherein the plate has a plurality of openings;
a plurality of integrated circuits provided on a surface of the circuit board, wherein the integrated circuits comprise a first processor, a second processor, a plurality of first memories and a plurality of second memories; the first processor is electrically connected to a part of the ports, while the second processor is electrically connected to another part of the ports; the first processor and the second processor are staggered on the surface; the first memories are provided on the surface of the circuit board near the first processor, and are also near an edge of the circuit board; the second memories are provided on the surface of the circuit board near the second processor, and are also near another edge of the circuit board; and
two heat sinks abutting against the first processor and the second processor, respectively, wherein an area of each of the heat sinks is greater than an area of each one of the first processor and the second processor; one of the heat sinks includes a first base, a second base, a plurality of first fins, and a plurality of second fins; the first base abuts against the first processor; the second base shades at least a part of the first memories without physically contacting the first memories; a thickness of the second base is less than a thickness of the first base; the first fins are connected to the first base, while the second fins are connected to the second base; a height of the first fins is greater than a height of the second fins; the other one of the heat sinks shades at least a part of the second memories without physically contacting the second memories.

13. The PCI Express network card of claim 12, wherein the other one of the heat sinks comprises a first base, a second base, a plurality of first fins, and a plurality of second fins; the first base abuts against the second processor; the second base shades at least a part of the second memories without physically contacting the second memories; a thickness of the second base is less than a thickness of the first base; the first fins are connected to the first base, while the second fins are connected to the second base; a height of the first fins is greater than a height of the second fins.

* * * * *